(12) United States Patent
Maigret et al.

(10) Patent No.: US 7,974,058 B2
(45) Date of Patent: Jul. 5, 2011

(54) GROUP PROTECTION MODULE FOR A SWITCHGEAR ARRANGEMENT AND SWITCHGEAR ARRANGEMENT HAVING SUCH A GROUP PROTECTION MODULE

(75) Inventors: Guillaume Maigret, Pessac (FR); Martin Moosburger, Leinburg (DE); Andreas Rößler, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 377 days.

(21) Appl. No.: 12/218,071

(22) Filed: Jul. 10, 2008

(65) Prior Publication Data
US 2009/0040673 A1 Feb. 12, 2009

(30) Foreign Application Priority Data

Jul. 10, 2007 (EP) .................................... 07013517

(51) Int. Cl.
*H02H 3/00* (2006.01)
(52) U.S. Cl. .......... 361/63; 361/729; 361/735; 438/188; 200/51.02; 200/51.03; 200/51.04; 200/51.05; 200/51.1
(58) Field of Classification Search .................. 361/63, 361/729, 735; 439/188; 200/51.02–51.05, 200/51.1
See application file for complete search history.

(56) References Cited

U.S. PATENT DOCUMENTS

| | | | |
|---|---|---|---|
| 3,912,889 A * | 10/1975 | Bright | 200/51.1 |
| 4,628,241 A | 12/1986 | Bristow et al. | |
| 6,172,872 B1 * | 1/2001 | Katsui | 361/695 |
| 7,371,981 B2 * | 5/2008 | Abdul-Hafiz | 200/51 R |

FOREIGN PATENT DOCUMENTS

| | | |
|---|---|---|
| DE | 101 02 316 A1 | 7/2002 |
| DE | 101 48 155 A1 | 4/2003 |
| JP | 61049323 A | 3/1986 |
| JP | 64012897 U | 1/1989 |
| JP | 04179335 A | 6/1992 |
| JP | 9017313 A | 1/1997 |
| KR | 100492758 B1 | 5/2005 |
| KR | 100594675 B1 | 6/2006 |

OTHER PUBLICATIONS

Heinz Zipperer; "Mehr Sicherheit für Mensch and Maschine—Safety Integrated"; Elektrotechnische Zeitschrift—ETZ; Sep. 1999; pp. 34-35, 37; vol. 120, No. 17; XP000924177; Verlag GmbH, Berlin, Germany.

* cited by examiner

*Primary Examiner* — Stephen W Jackson
*Assistant Examiner* — Tien Mai (57) ABSTRACT

A group protection module for a switchgear arrangement is provided in order to protect a group of load feeders, each having a contactor for connecting or disconnecting a respective load. The group protection module has a circuit breaker for providing short-circuit protection, said circuit breaker being connected to a supply-side input and to a load-side output of the group protection module for connection to a power supply system and for connecting the group of load feeders. The group protection module has a safety evaluation unit via which the circuit breaker can be tripped if a status signal detectable by the respective load feeders indicates that one of the contactors of the load feeders can no longer be de-energized. The group protection module is implemented as a constructional unit.

19 Claims, 5 Drawing Sheets

GROUP PROTECTION MODULE FOR A SWITCHGEAR ARRANGEMENT AND SWITCHGEAR ARRANGEMENT HAVING SUCH A GROUP PROTECTION MODULE

CROSS REFERENCE TO RELATED APPLICATIONS

This application claims priority of European Patent Office application No. 07013517.3 EP filed Jul. 10, 2007, which is incorporated by reference herein in its entirety.

FIELD OF INVENTION

The invention relates to a group protection module for a switchgear arrangement for protecting a group of load feeders, in particular of motor starters, each having a contactor for switching a respective load on or off, said group protection module having a circuit breaker for implementing short-circuit protection. The circuit breaker is connected to a supply-side input and a load-side output of the group protection module for connection to a power supply system and for connecting the group of load feeders. The group protection module has a safety evaluation unit via which the circuit breaker can be tripped if a status signal detectable by the respective load feeders indicates that one of the contactors of the load feeders can no longer be de-energized.

The invention also relates to a switchgear arrangement comprising a group of load feeders, in particular of motor starters, each having at least one contactor for switching a particular load on or off. The switchgear arrangement is preceded by a circuit breaker for providing short-circuit protection, said circuit breaker having a supply-side input for connection to a power supply system and a load-side output for connecting the load feeders. The switchgear arrangement has a safety evaluation function by means of which the circuit breaker can be tripped if a status signal detectable by the respective load feeders indicates that one of the contactors of the load feeders can no longer be de-energized.

BACKGROUND OF INVENTION

The unexamined German patent application DE 101 48 155 A1 discloses an arrangement for monitoring motor starters connected to a power supply line and communicating with a control device via a control bus. Each motor starter has a measuring device for measuring the current flowing through the motor starter. A circuit breaker is provided in the power supply line and said circuit breaker is assigned a tripping device which can be controlled by the control device via the control bus as a function of the measured current.

The unexamined German patent application DE 101 02 316 A1 discloses a motor starter arrangement comprising a first electrical switching device, in particular a circuit breaker, with an electronic tripping unit and a second electrical switching device, in particular a contactor. The switching devices are connected in series for connecting or disconnecting an at least 1-phase load to/from a power source. Means of bidirectional communication between the first and second switching device are provided, the first switching device and the means of communication being implemented in such a way that tripping of the first switching device is delayed if an overload occurs, within this time the second switching device is prompted to disconnect by the communication means and, if the second switching device fails to disconnect, tripping is effected by the first switching device.

Such switching arrangements are generally known.

In the context of safety engineering, safety-relevant switching states of modules are often detected and monitored by means of switches, such as auxiliary contact switches, for example. In certain cases it is permissible to connect the switches of the modules electrically in series to form a status signaling loop. If a switch of the respective modules then opens, the electrical supply can be overridingly shut off centrally.

From the prior art it is known to wire the switches manually, in particular the auxiliary contact switches mounted on contactors for operational load switching. This approach is time-consuming and prone to error. It is also known in this context that the status signaling loop can be automatically extended by plugging modules together by means of mating connectors. In this case the "open" contacts of the last module must be connected to one another in a still electrically conducting manner.

SUMMARY OF INVENTION

An object of the invention is to specify a group protection module for a switchgear arrangement comprising a group of load feeders which provides a simplified monitoring capability for the load feeders.

Another object of the invention is to specify a switchgear arrangement incorporating a group protection module of said kind.

The object of the invention is achieved by means of a group protection module having the features set forth in an independent claim. Advantageous embodiments of the group protection module are recited in dependent claims. A further independent claim describes a switchgear arrangement having such a group protection module with a group of load feeders. Further dependent claims describe advantageous embodiments of the switchgear arrangement.

According to the invention, the group protection module is implemented as a constructional unit. It has a first and second loop contact connected to the safety evaluation unit. The two loop contacts are component parts of a prefabricated first connector. The first connector is accessible from outside the housing and implemented such that a second connector of a load feeder is intermateable with the first connector of the group protection module to create an automatic status signaling loop. The safety evaluation unit trips if the status signaling loop is interrupted.

The particular advantage is that, by simply plugging a load feeder to the group protection module, monitoring of the at least one contactor of the attached load feeder is possible without any complex installation work. If further load feeders are butt-mounted side by side, the monitoring capability is also extended automatically to these additional load feeders.

The safety evaluation unit essentially exhibits the function of a modular safety relay manufactured by Siemens. Safety relays of this kind are available from Siemens under the ordering number 3TK28-xx-yyyyy, where "xx" and "yyyyy" are number and letter combinations designating a variety of versions of the safety relay. The safety evaluation unit is preferably of redundant design. The connectable emergency OFF buttons or other switches are preferably interrogated on a two-channel basis. In addition, the safety evaluation unit has a "safe" output for controlling a tripping unit. The tripping unit is e.g. a solenoid actuator which, in the event of current excitation or the absence of current excitation, acts on a breaker mechanism of the circuit breaker integrated in the group protection module. The safety evaluation unit typically has at least one microcontroller which is appropriately embodied to meet engineering safety requirements. The at least one microcontroller is also connected to a bus interface unit for data interchange with the internal bus system via which the modules are also connected to the DIN rail. The bus interface unit can already be integrated in the at least one microcontroller. If it is indicated to the safety evaluation unit via the bus system that, in spite of an open command to a load feeder, the relevant contactor remains closed, the safety evaluation unit opens a switch in the group protection module in order to centrally shut off the supply voltage for all the contactors of the load feeders. The supply voltage, e.g. 24 VDC, is preferably fed to the group protection module by a power supply module likewise mounted to the DIN rail. To detect that a contactor no longer opens, the load feeders can each have current monitoring circuit. Finally, in the event of a contactor being indicated via the internal bus system as no longer opening, the safety evaluation unit can cause the circuit breaker to trip.

According to one embodiment, the group protection module has a block-shaped housing suitable for butt-mounting to a DIN rail, thereby further simplifying installation. This means that the inventive group protection module can be automatically connected to a power supply module typically likewise mounted to the DIN rail and to a control module for mutual data communication.

In particular, the first and second connector are disposed such that the second connector of the load feeder and the first connector of the group protection module are automatically intermated when the load feeder is attached to the group protection module, thereby advantageously simplifying installation still further.

According to one embodiment, the safety evaluation unit checks the status signaling loop for an interruption only after an emergency or safety disconnection. In particular, connector contacts are likely to be fused after such disconnections. In this case it is checked during a reconnection attempt whether all the switches in the status signaling loop are still closed. The switches are preferably auxiliary contact switches which are positively driven with the main contacts of the respective contactor. If at least one of the contactor main contacts is fused, the corresponding auxiliary contact switch is open.

The object of the invention is also achieved by means of a switchgear arrangement having a group protection module according to the invention.

By integrating short-circuit protection and the independent load disconnection capability in a (single) module, a switchgear arrangement of said kind has an extremely compact design. In addition, it is advantageously possible to dispense with a separate incoming-feeder contactor which is generally provided as a second independent switching point for group disconnection of the load feeders. In addition, an interconnection module can be advantageously dispensed with.

The group of load feeders is typically block-shaped to allow modular butt-mounting to a DIN rail, thereby simplifying installation still further. This enables the load feeders to be automatically connected to a power supply module typically likewise mounted to the DIN rail for supplying power and to a control module for data communication.

According to another embodiment, the load feeders each have a module housing, a switch, a feed contact, a return contact, a first and second forwarding contact, a switching device and a first and second actuating element. The switches and the switching device are disposed in the module housing. The feed contact and the first forwarding contact are interconnected via the switch and the return contact and the second forwarding contact are interconnected directly. The feed contact, the return contact and the first actuating element are component parts of a second prefabricated connector and the forwarding contacts and the second actuating element are component parts of a third prefabricated connector. The connectors are accessible from outside of the module housing and embodied such that the second connector of a first modular load feeder is intermateable with the third connector of a second modular load feeder. By mating the connectors, one of the forwarding contacts of the second load feeder is connected to the feed contact and the return contact of the first load feeder in each case. The first actuating element of the first load feeder acts on the second actuating element of the second load feeder such that the switching device of the second load feeder interrupts a current path from the first to the second forwarding contact of the second load feeder.

The particular advantage of this is that, by simply plugging one load feeder to another load feeder, it is possible to provide an automatic, self-extending status signaling loop that can be monitored by the group protection module according to the invention.

According to another embodiment, the switching device is implemented as a mechanical switching device. The actuating elements are implemented as mechanical actuating elements.

Alternatively the switching device can be implemented as an electronic switching device. The actuating elements can be implemented as electrically interacting contacts.

In particular, the connectors are disposed such that the second connector of the first load feeder and the third connector of the second load feeder are intermated automatically when the first load feeder is attached to the second load feeder, thereby simplifying installation still further.

Finally, the switchgear arrangement has a control module which has a terminal for connecting to a higher-order bus system and which is communicatively connected via an internal bus system to a control unit of the group protection module and to a control unit of each of the connected load feeders.

This enables the contactors in the respective load feeders to be controlled individually in an application-related manner, e.g. via a process computer connected to the higher-order bus system. Conversely, switching states of the respective load feeders can be interrogated and transmitted to the process computer. The higher-order bus system is e.g. a Profibus or a field bus. The internal bus system is e.g. a backplane bus or an internal bus that is self-extending via the butt-mounted modular subassemblies, such as power supply module, group protection module and the load feeders.

BRIEF DESCRIPTION OF THE DRAWINGS

The invention and advantageous embodiments of the invention will now be described in greater detail with reference to the following figures, in which.

DETAILED DESCRIPTION OF INVENTION

Figure 1:
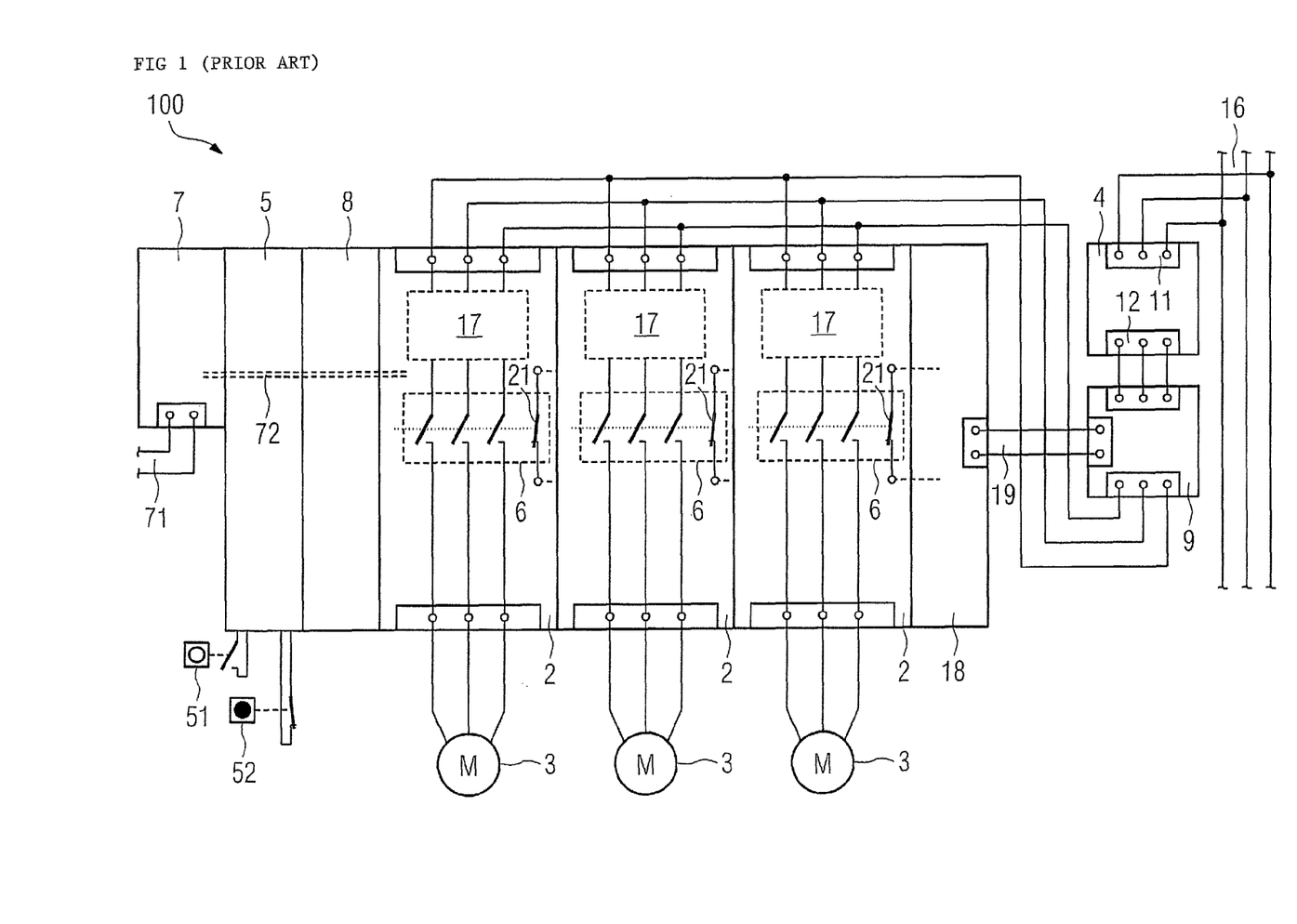
FIG. 1 shows a switchgear arrangement according to the prior art.

FIG. 1 shows a three-pole switchgear arrangement 100 according to the prior art. Apart from the modules 4 and 9, all the modules 2, 5, 7, 18 shown are butt-mounted e.g. to a DIN rail. In the right-hand section of FIG. 1 can be seen a power supply system 16 to which a circuit breaker 4 is connected to provide short-circuit protection. The circuit breaker 4 is followed by an incoming-feeder contactor 9 which in turn precedes a group of load feeders 2. In the example in FIG. 1, the three load feeders 2 are e.g. motor starters integrating overcurrent protection 17. The loads 3 connected thereto are three-phase electric motors. The incoming-feeder contactor 9 is additionally connected via connecting leads 19 to an interconnection module 18. The latter is wired to a switch 21 of each of the load feeders 2 and to a safety evaluation unit 5 such that the incoming-feeder contactor 9 can be tripped in the event of one or more of the switches 21 being open. For the sake of clarity, the wiring of the switches 21 to the interconnection module 18 itself is not shown. The switches 21 are preferably connected in series, thereby forming a status signaling loop.

Shown in the left-hand section of FIG. 1 is a control module 7. It is used for connecting to a higher-order bus system 71, such as a Profibus or field bus. The control module 7 is additionally connected to an internal bus system 72 which provides a data link between the modules 2, 5, 7, 8. The control module 7 therefore transfers the data traffic from the higher-order bus system 71 to the internal bus system 72 and vice versa.

A closing pushbutton 51 and an emergency stop pushbutton 52 are typically connected to the safety evaluation unit 5. The safety evaluation unit 5 has means (not shown in greater detail) for reliably detecting the two pushbuttons 51, 52. It also checks whether, after pressing of the emergency stop pushbutton 52 or opening of a safety switch, e.g. of a monitored door or light curtain, the loads 3 have been safely disconnected. If the closing pushbutton 51 is pressed following reclosure of the switching arrangement 100, the safety evaluation unit 5 checks whether all the switches 21 of the load feeders 2 are still closed. If not, the safety evaluation unit 5 trips the incoming-feeder contactor 9.

Figure 2:
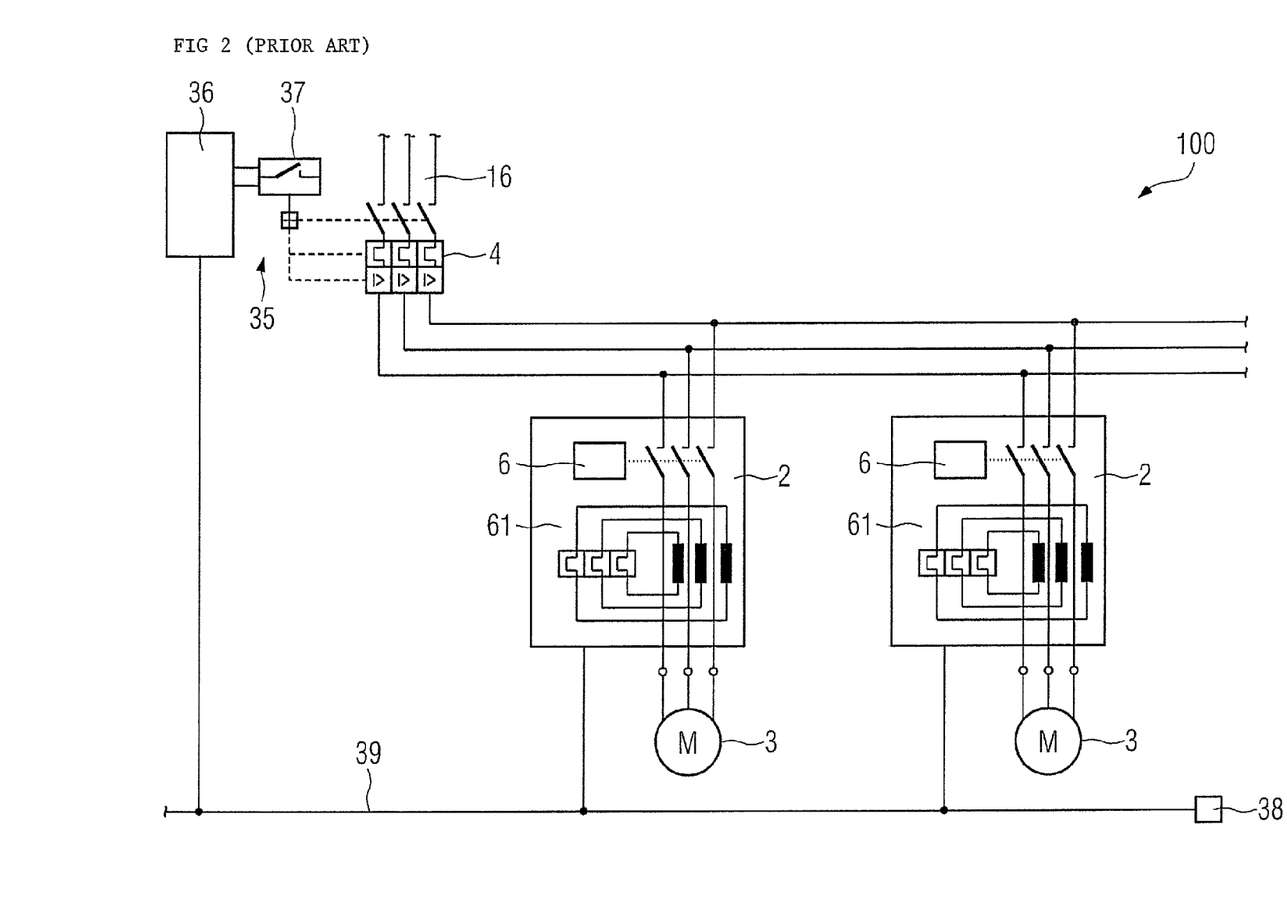
FIG. 2 shows another switchgear arrangement according to the prior art.

FIG. 2 shows another switchgear arrangement according to the prior art. The upper left-hand section of FIG. 2 shows a circuit breaker 4 which, in the event of a short circuit, disconnects the motor starters 2 shown from a power supply system 16. The circuit breaker 4 can be tripped independently thereof by means of a tripping device 35. The latter has an ASi-safe slave 36 with bus capability and a trip element 37 which acts on a breaker mechanism of the circuit breaker 4 for opening. The two motor starters 2, the ASi slave 36 and a control device 38 or bus master are jointly connected to an ASi bus 39.

The two motor starters 2 each have a contactor 6 for disconnecting an electric motor 3 from the power supply system 16. In addition, the motor starters 2 each have a current measuring device 61. If the respective motor starter 2 detects an overcurrent, it issues a break command to the tripping device 35 via the ASi bus 39. Correspondingly, a break command is issued if, despite a "supposedly" de-energized contactor 6, a current flow to the load 3 were to be measured. This is mainly the case when the main contacts of the contactor 6 can no longer be opened because of fusing.

Figure 3:
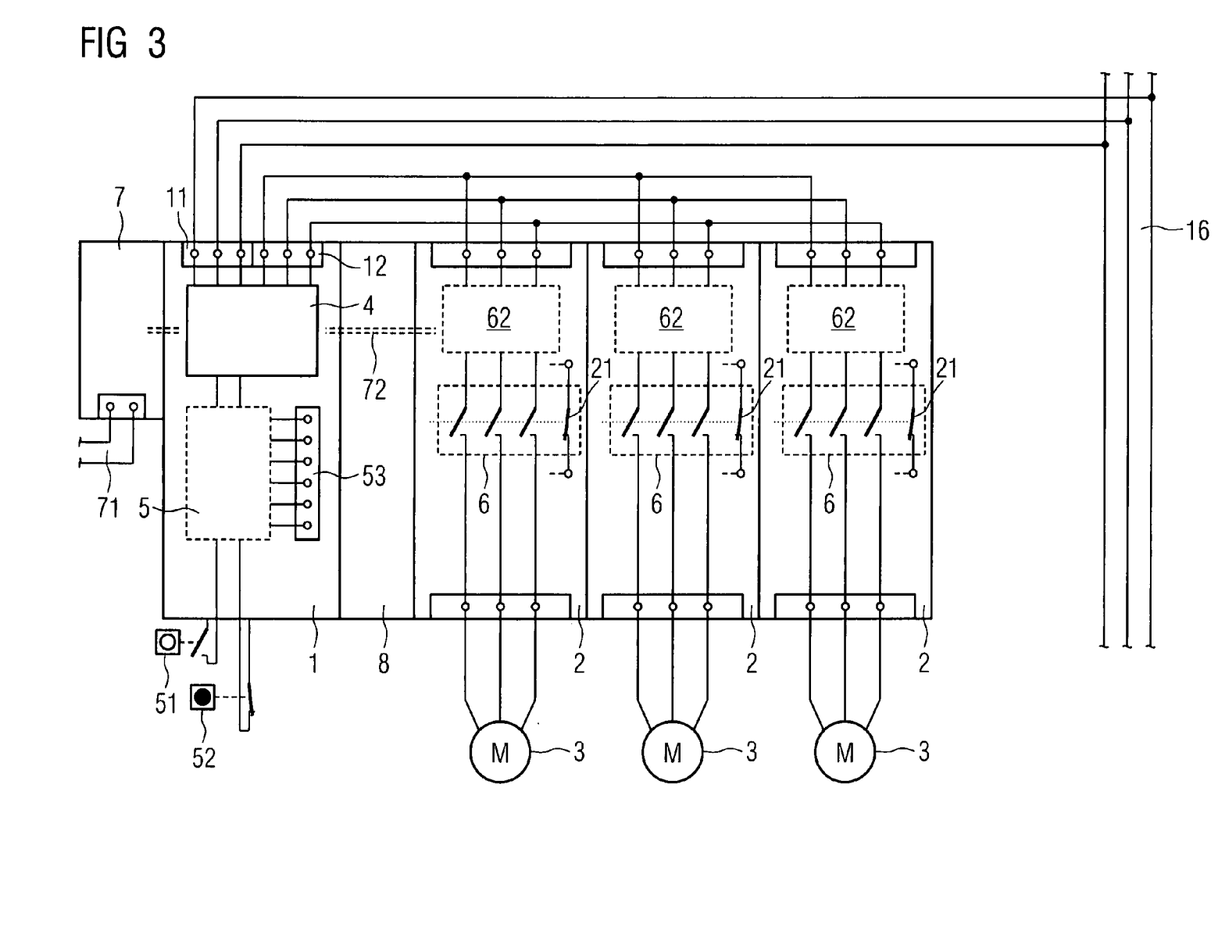
FIG. 3 shows an example of a switchgear arrangement with a group protection module according to the invention.

FIG. 3 shows an example of a switchgear arrangement 100 with a group protection module 1 according to the invention. The switchgear arrangement 100 shown is e.g. of three-pole design. Alternatively it can be of single-pole, two-pole or more than three-pole design. Said switchgear arrangement 100 is of a similar type to the switchgear arrangement 100 shown in FIG. 1, except that there is no separate circuit breaker 4 and incoming-feeder contactor 9. In addition, the interconnection module 18 is not present. The load feeders 2 are in turn e.g. motor starters, the loads 3 three-phase electric motors.

According to the invention, the switchgear arrangement 100 has a group protection module 1 for protecting the load feeders 2. The group protection module 1 has a circuit breaker 4 to implement short-circuit protection. The circuit breaker 4 is connected to a supply-side input 11 and to a load-side output 12 of the group protection module 1 implemented as a constructional unit for connecting to a power supply system 16 and for connecting the group of load feeders 2. The group protection module 1 also has a safety evaluation unit 5 via which the circuit breaker 4 can be tripped if a status message detectable by the respective load feeders 2 indicates that one of the contactors 6 of the load feeders 2 can no longer be de-energized.

Status signaling is effected by detection and monitoring of the switching state of the respective switches 21 of the load feeders 2 by the safety evaluation unit. The respective switch 21 is in particular an auxiliary contact switch which is positively driven by the main contacts of the respective contactor 6 in the load feeder 2. The respective switches 21 can be wired e.g. to a terminal panel 53 of the group protection module 1 disposed on the outside of the housing. If the safety evaluation unit 5 detects that at least one of the switches 21 is open, e.g. by injecting a test current or applying a test voltage, a corresponding tripping signal can be fed out via the internal connecting leads (not indicated in further detail) between the safety evaluation unit 5 and the circuit breaker 4.

In addition, the group protection module 1 shown, as well as the load feeders 2, the power supply module 8 and the control module 7, each have a block-shaped housing 10 or module housing 20 for buttable mounting to a DIN rail.

In the example in FIG. 3, the control module 7 additionally has a terminal for connecting to a higher-order bus system 71 and to an internal bus system 72. The latter is used for communicatively linking at least the group protection module 1 and the connected load feeders 2.

Figure 4:
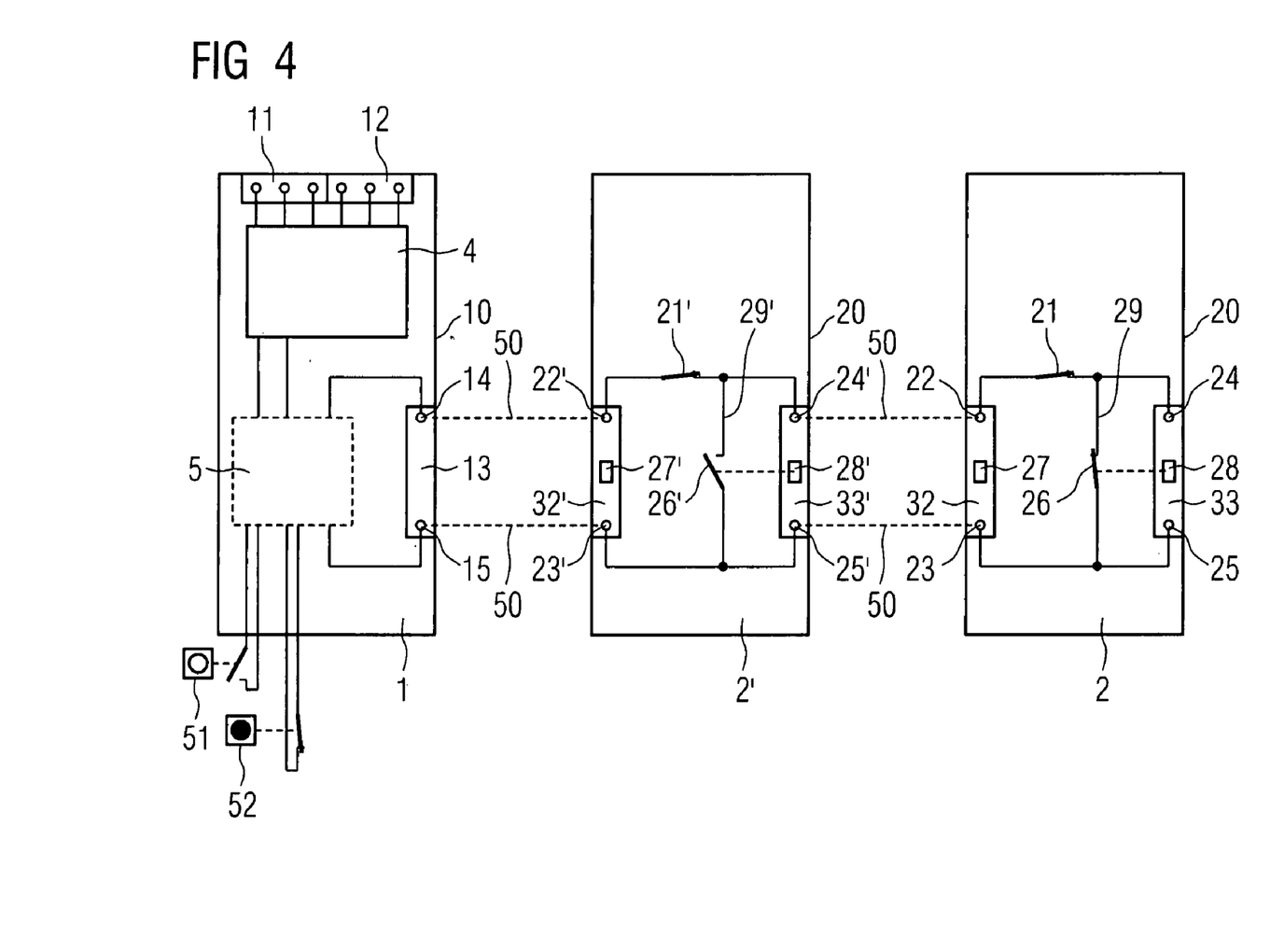
FIG. 4 shows an example of a group protection module with two load feeders inserted in series according to an embodiment of the invention.

FIG. 4 shows an example of a group protection module 1 with load feeders 2, 2' inserted in series according to an embodiment of the invention. As far as the design of the individual modules 2, 2' is concerned, only the design of the first module 2 will now be explained in greater detail. The second module 2'—insofar as it relates to the subject matter of the invention—is of analog design. The elements of the second module 2' are therefore provided with the same reference characters as the corresponding elements of the first module 2, but with the addition of an apostrophe.

The left-hand section of FIG. 4 shows a second load feeder 2' plugged into a group protection module 1. A first load feeder 2 is plugged into the second load feeder 2'. The modules 1, 2', 2 shown are implemented such that plugging the modules together produces an automatically self-establishing status signaling loop 50 which can then be detected and monitored by the group protection module 1.

For this purpose the group protection module 1 has a first and second loop contact 14, 15 connected to the safety evaluation unit 5. The two loop contacts 14, 15 are component parts of a prefabricated first connector 13. The first connector 13 is accessible from outside the housing 10 and implemented such that a second connector 32 of a load feeder 2' is intermateable with the first connector 13 of the group protection module 1 in order to set up the status signaling loop 50. The safety evaluation unit 5 trips if the status signaling loop 50 is interrupted.

In particular, the safety evaluation unit 5 checks the status signaling loop 50 for an interruption only after an emergency or safety disconnection. In addition, the first and second connector 13, 32' are disposed such that the second connector 32' of the load feeder 2' and the first connector 13 of the group protection module 1 are automatically intermated when the load feeder 2' is attached to the group protection module 1.

The first load feeder 2 has a module housing 20, a switch 21, a feed contact 22, a return contact 23, a first and second forwarding contact 24, 25, a switching device 26 and a first and second actuating element 27, 28. The switch 21 is preferably an auxiliary contact switch of the respective contactor 6 of the load feeders 2. The switch 21 and the switching device 26 are disposed in the module housing 20. The feed contact 22 and the first forwarding contact 24 are connected via the switch 21. In addition, the return contact 23 and the second forwarding contact 25 are interconnected directly. The feed contact 22, the return contact 23 and the first actuating element 27 are component parts of a second prefabricated connector 32 and the forwarding contacts 24, 25 and the second actuating element 28 are component parts of a third prefabricated connector 33. The two connectors 32, 33 are accessible from outside the module housing 20 and implemented such that the second connector 32 of a first modular load feeder 2 is intermateable with the third connector 33' of a second modular load feeder 2'. Intermating of the connectors 32, 33' causes one of the forwarding contacts 24', 25' of the second load feeder 2' to be connected to the feed contact 22 and the return contact 23 of the first load feeder 2, the first actuating element 27 of the first load feeder 2 acting on the second actuating element 28' of the second load feeder 2' such that the switching device 26' of the second load feeder 2' interrupts a current path 29' from the first to the second forwarding contact 24', 25' of the second load feeder 2'.

In the example in FIG. 4 it can be seen that the switching device 26' of the left-hand load feeder 2' is opened by the second actuating element 28' and that therefore a test current injected by the group protection module 1 is forced to flow to the next load feeder 2. However, the switching device 26 of the right-hand load feeder 2 is closed, as no other load feeder 2 is connected thereto. The test current can therefore flow back via the closed switching device 26 to the group protection module 1.

The connectors 32, 33' of the load feeders 2, 2' are preferably disposed such that the second connector 32 of the first load feeder 2 and the third connector 33' of the second load feeder 2' are intermated automatically when the first load feeder 2 is attached to the second load feeder 2'.

Figure 5:
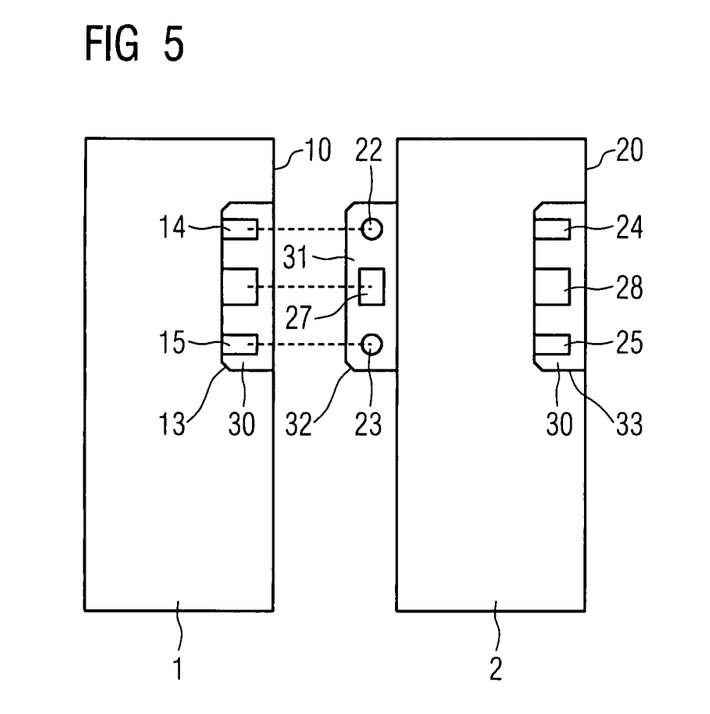
FIG. 5 shows an embodiment of mating connectors for connecting the group protection module to e.g. a single load feeder.

FIG. 5 shows an embodiment of connectors 13, 32, 33 for connecting the group protection module 1 to e.g. a single load feeder 2. The switching device 26 is implemented as a mechanical switching device. The actuating elements 27, 28 are implemented as mechanical actuating elements. The switching device can alternatively be implemented as an electronic switching device. The actuating elements can be alternatively implemented as electrically interacting contacts.

In the example in FIG. 5, the first connector 13 is a jack which is implemented as a recess 30 in the housing 10 of the group protection module 1. The two loop contacts 14, 15 are implemented as planar contacts which contact a corresponding feed and return contact 22, 23 when a plug 32 of a load feeder 2 corresponding to the jack 13 is inserted. The plug 32 is implemented as a projection 31 on an outer side of the load feeder 2. The first actuating element 27 is preferably implemented on the plug 32 as a lateral lug which, when the plug 32 is inserted in the jack 33 of a load feeder (not shown in further detail), deflects a movable counterpart 28. Said counterpart 28 acts on a movable contact of the switching device 26, causing it to open.

In addition, the group protection module 1 can also have a switching device connected between the two loop contacts 14, 15. This can then interact with an additional second actuating element such that the switching device is automatically opened when a load feeder 2 is inserted.

Figure 6:
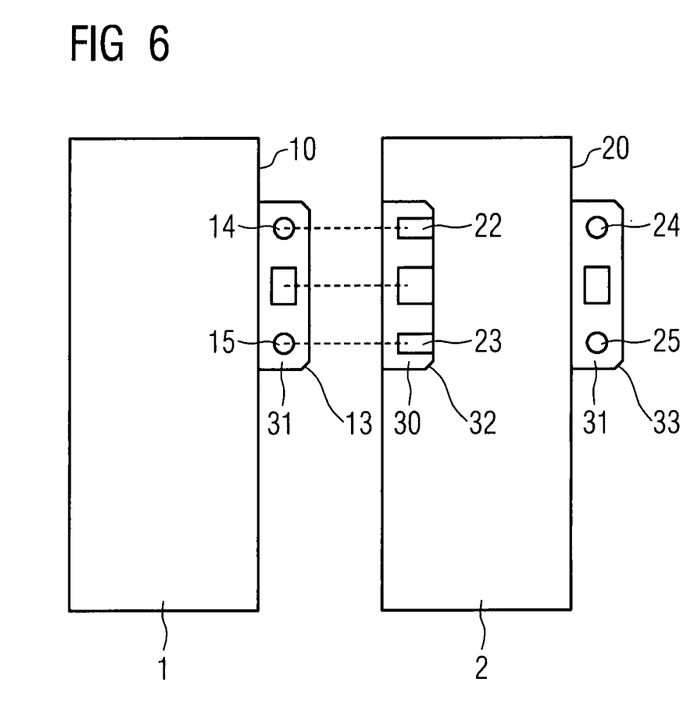
FIG. 6 shows another embodiment of mating connectors for connecting the group protection module to e.g. a single load feeder.

FIG. 6 shows another embodiment of connectors 11, 32, 33 for connecting the group protection module 1 to e.g. a single load feeder 2. In this case the connectors 13, 32, 33 are implemented in converse manner, i.e. the first and third connector 13, 33 as plugs and the second connector 32 as a jack.

The invention claimed is:

1. A group protection module for a switchgear arrangement for protecting one or more load feeder operative with the group protection module, each load feeder having a contactor for connecting or disconnecting a load from a power source, the group protection module comprising:
    a circuit breaker for implementing short-circuit protection, wherein the circuit breaker is connected to a supply-side input and a load-side output of the group protection module for respective connection to a power supply system and connection to the group of load feeders;
    a safety evaluation unit for tripping the circuit breaker if a status signal indicates that a contactor in one of the load feeders has not been de-energized and for determining the status signal by checking a status signaling loop;
    a first and a second loop contact connected to the safety evaluation unit, wherein the first and second loop contacts are component parts of a prefabricated first connector, wherein the first connector is accessible from outside a housing of the group protection module such that a second connector of the one or more load feeders is intermateable with the first connector to establish the status signaling loop, the status signaling loop further comprising a first switch within each one of the load feeders and operative with the contactors, the first switch controlled to an open configuration responsive to the contactor in an opened configuration and the first switch controlled to a closed configuration responsive to the contactor in a closed configuration, wherein if each of the contactors remains in the closed configuration upon receiving a command to open, the first switch remains in the open configuration thereby interrupting the status signaling loop, wherein the safety evaluation unit opens the circuit breaker responsive to an open status signaling loop and wherein the safety evaluation unit checks the status of the signaling loop for an interruption only after an emergency or safety disconnection of the contactor from the power source; and
    each of the one or more load feeders further comprising a second switch connected across the first and the second loop contacts, the second switch in a closed condition in a last load feeder of a string of the one or more load feeders, and the second switch in an open condition in each of the one or more load feeders of the string of load feeders except the last load feeder.

2. The group protection module as claimed in claim 1, wherein the group protection module is a constructional unit.

3. The group protection module as claimed in claim 1, wherein the group protection module has a block-shaped housing for buttable mounting to a DIN rail.

4. The group protection module as claimed in claim 2, wherein the group protection module has a block-shaped housing for buttable mounting to a DIN rail.

5. The group protection module as claimed in claim 2, wherein the first and second connector are disposed such that the second connector of the load feeder and the first connector of the group protection module are electrically connected when the load feeder is attached to the group protection module.

6. The group protection module as claimed in claim 3, wherein the first and second connector are disposed such that the second connector of the load feeder and the first connector of the group protection module are electrically connected when the load feeder is attached to the group protection module.

7. A switchgear arrangement for controlling one or more load feeders, each having at least one contactor for connecting or disconnecting a respective load from a power source, comprising:
   a circuit breaker for providing short-circuit protection, said circuit breaker having a supply-side input for connecting to a power supply system and a load-side output for connecting to the load feeders;
   a safety evaluation unit to trip the circuit breaker if a status signal indicates that a contactor in one of the load feeders has not been de-energized and the safety evaluation unit for determining the status signal by checking the status signaling loop;
   a group protection module having a first and second loop contact connected to the safety evaluation unit, wherein the first and the second loop contacts are component parts of a first connector, wherein the first connector is accessible from outside a housing of the group protection module such that a second connector of one or more of the load feeders is intermateable with the first connector to establish a status signaling loop, the status signaling loop further comprising a first switch within each one of the load feeders and operative with the contactors, the first switch controlled to an open configuration responsive to the contactor in an open configuration, wherein if each one of the contactors remains in the closed configuration upon receiving a command to open, the first switch remains in the open configuration thereby interrupting the status signaling loop, wherein the safety evaluation unit opens the circuit breaker responsive to an open status signaling loop, and wherein the safety evaluation unit checks the status of the signaling loop for an interruption only after an emergency or safety disconnection of the contactor from the power source; and
   each of the one or more load feeders further comprising a second switch connected across the first and the second loop contacts, the second switch in a closed condition in a last load feeder of a string of the one or more load feeders, and the second switch in an open condition in each of the one or more load feeders of the string of load feeders except the last load feeder.

8. The switchgear arrangement as claimed in claim 7, wherein the load feeder is a motor starter.

9. The switchgear arrangement as claimed in claim 7, wherein the group of load feeders is block-shaped for modular, buttable mounting to a DIN rail.

10. The switchgear arrangement as claimed in claim 7, wherein
   the one or more load feeders each have a module housing, a first and second actuating element, and a first and second forwarding contact, wherein the first contact comprises a feed contact, and the second contact comprises a return contact;
   the first and the second switches disposed in the module housing, wherein
   the feed contact and the first forwarding contact are interconnected via the first switch, and the return contact and the second forwarding contact are interconnected directly, wherein
   the feed contact, the return contact and the first actuating element are component parts of the first connector, the first connector comprising a first prefabricated connector, and the first and second forwarding contacts and the second actuating element are component parts of a second prefabricated connector, wherein
   the first and second connectors are accessible from outside the module housing and are implemented such that the first connector of a first modular load feeder is intermateable with the second connector of a second modular load feeder, and wherein
   intermating of the connectors causes the first and the second forwarding contact of the second load feeder to be connected to the feed contact and the return contact of the first load feeder, and the first actuating element of the first load feeder acts on the second actuating element of the second load feeder such that the second switch of the second load feeder interrupts a current path from the first to the second forwarding contact of the second load feeder.

11. The switchgear arrangement as claimed in claim 10, wherein the second switch is implemented as a mechanical switching device, and wherein the first and second actuating elements are implemented as mechanical actuating elements.

12. The switchgear arrangement as claimed in claim 10, wherein the second switch is implemented as an electronic switching device, and wherein the first and second actuating elements are implemented as electrically interacting contacts.

13. The switchgear arrangement as claimed in claim 10, wherein the first and second connectors are disposed such that the first connector of the first load feeder and the second connector of the second load feeder are intermated, when the first load feeder is attached to the second load feeder.

14. The switchgear arrangement as claimed in claim 7, wherein the switchgear arrangement has a control module which has a terminal for connecting to a higher-order bus system and which is communicatively connected via an internal bus system to a control unit of the group protection module and to a control unit of each of the connected load feeders.

15. The switchgear arrangement as claimed in claim 8, wherein the switchgear arrangement has a control module which has a terminal for connecting to a higher-order bus system and which is communicatively connected via an internal bus system to a control unit of the group protection module and to a control unit of each of the connected load feeders.

16. The switchgear arrangement as claimed in claim 10, wherein the switchgear arrangement has a control module which has a terminal for connecting to a higher-order bus system and which is communicatively connected via an internal bus system to a control unit of the group protection module and to a control unit of each of the connected load feeders.

17. The switchgear arrangement as claimed in claim 11, wherein the switchgear arrangement has a control module which has a terminal for connecting to a higher-order bus system and which is communicatively connected via an internal bus system to a control unit of the group protection module and to a control unit of each of the connected load feeders.

18. The switchgear arrangement as claimed in claim 12, wherein the switchgear arrangement has a control module which has a terminal for connecting to a higher-order bus system and which is communicatively connected via an internal bus system to a control unit of the group protection module and to a control unit of each of the connected load feeders.

19. The switchgear arrangement as claimed in claim 13, wherein the switchgear arrangement has a control module which has a terminal for connecting to a higher-order bus system and which is communicatively connected via an internal bus system to a control unit of the group protection module and to a control unit of each of the connected load feeders.

* * * * *